Patented Oct. 10, 1922.

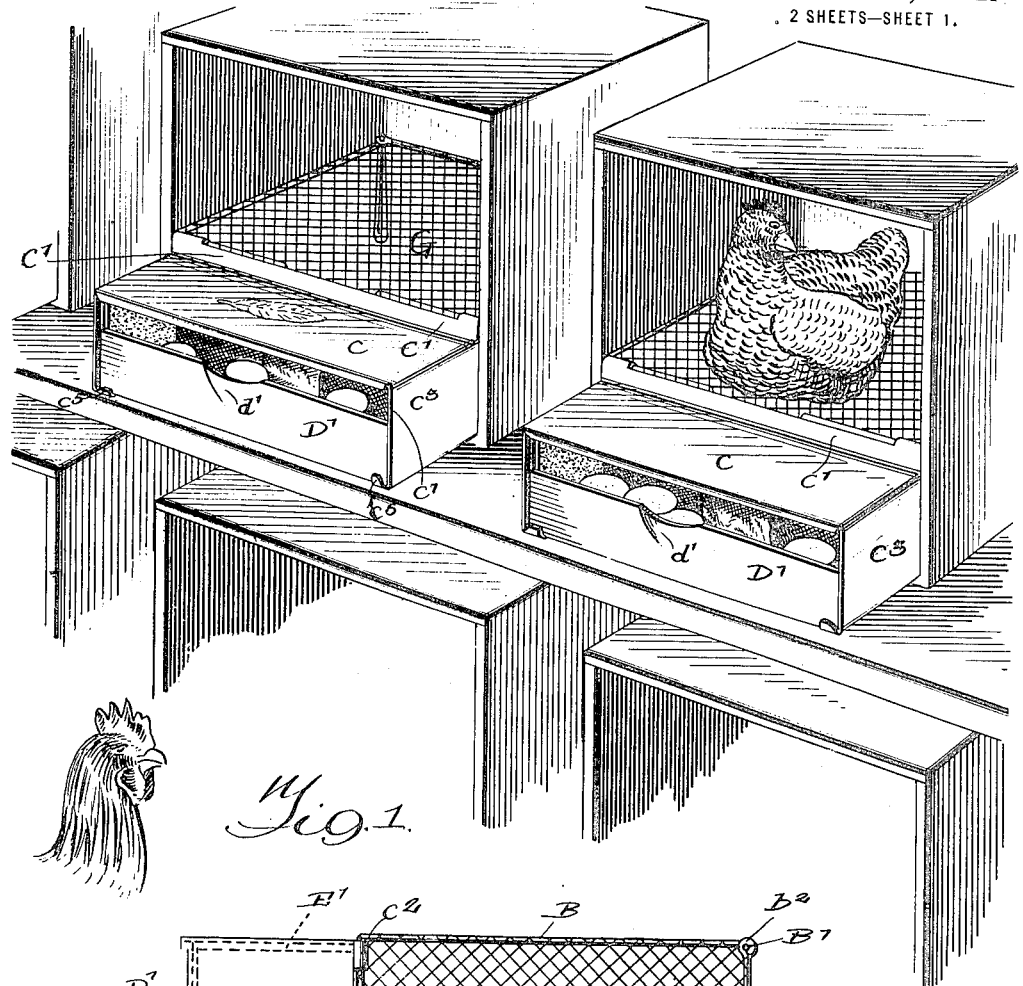
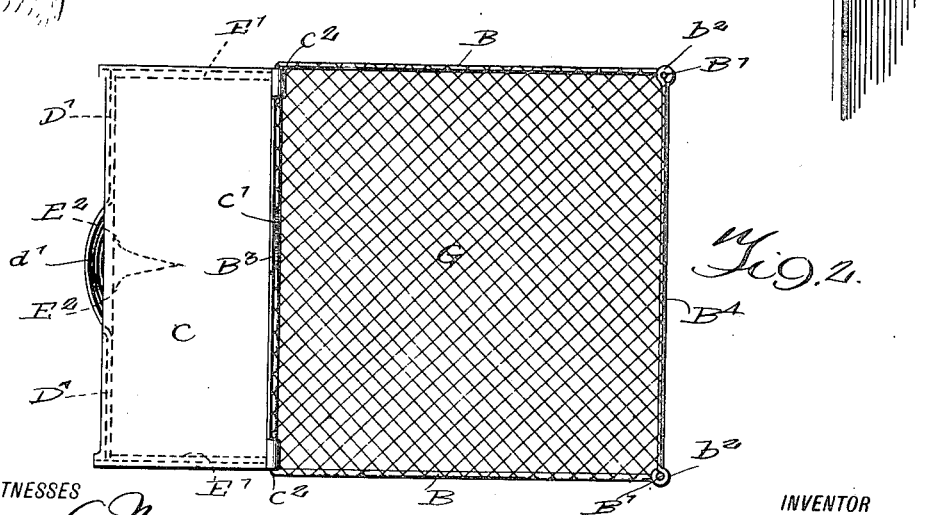

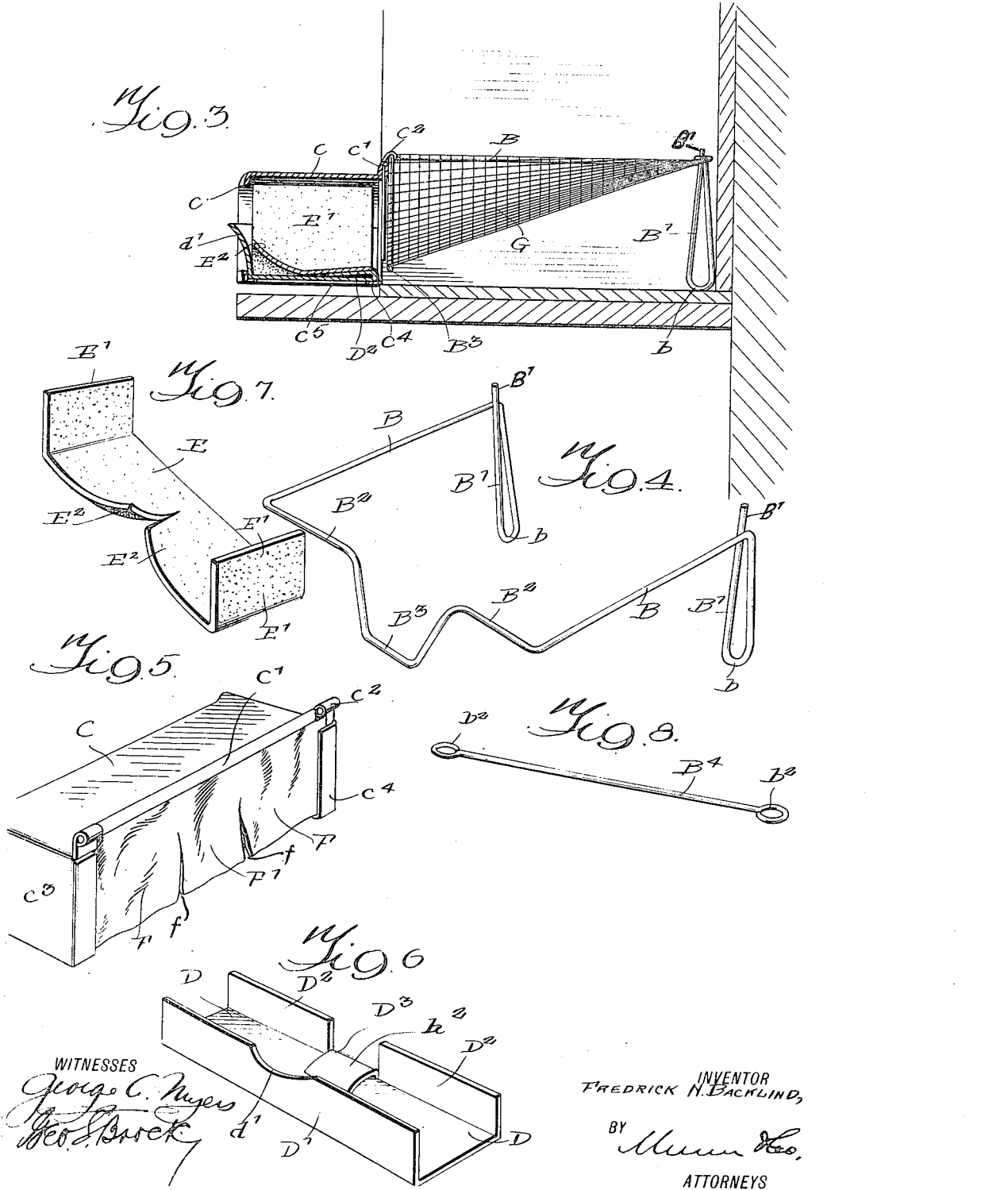

1,431,278

UNITED STATES PATENT OFFICE.

FREDRICK NILSON BACKLIND, OF DETROIT, MINNESOTA.

HEN'S NEST.

Application filed September 14, 1921. Serial No. 500,582.

*To all whom it may concern:*

Be it known that I, FREDRICK N. BACKLIND, a citizen of Sweden, and a resident of the city of Detroit, in the county of Becker and State of Minnesota, have invented certain new and Improved Hens' Nests, of which the following is a specification.

This invention relates to nests for hens and has reference more particularly to a device for saving eggs that is adapted to be used with any form of nest, trap or brooder, or with a simple box casing or without any casing whatever.

An object of the device is to provide means whereby eggs are immediately upon being laid, trapped into a compartment separate from the nest proper so as to prevent the hen from eating the eggs or breaking them by walking on them or otherwise.

Another object is to provide a nest so constructed that a brooding hen cannot sit upon eggs not intended for hatching and addle them.

Another object of the invention is to provide a nest that may be used free or substantially free of straw whereby a hen may be kept out of straw during laying, thereby preventing the hen from becoming a host for mites, lice and other vermin.

With these and other objects in view my invention consists in certain novel features of construction, arrangement and combination of parts as will be hereinafter fully set forth and pointed out in the claims, reference being had to the accompanying drawings, in which:

Fig. 1 is a perspective view showing the invention as in use,

Fig. 2 is a top plan view of the adapter,

Fig. 3 is a vertical longitudinal section showing the nest mounted in a casing,

Fig. 4 is a perspective view of a skeleton frame for the nest,

Fig. 5 is a rear perspective view of the egg receptacle or trap,

Fig. 6 is a perspective view of the removable egg tray,

Fig. 7 is a perspective view of the filler for the tray,

Fig. 8 is a perspective view of the tension bar of the nest frame.

Referring more particularly to the drawing A designates a casing with which my invention may be used, such casing being usually made of galvanized steel which has been found the best to keep away lice from the hen. This casing may be stamped from a single sheet and has the form of an open front box.

However my invention may be used with any form of casing or nest and indeed without any casing whatever, but be simply hung upon the wall or a post or supported upon a shelf.

The inventive idea involved in the present invention is confined to the nest and the egg receptacle or chamber at the front thereof.

The nest member comprises a frame upon which is suspended a flexible net. The frame consists of the side bars B the rear corner legs B' and the front bar $B^2$ which has a central downwardly bent portion $B^3$, all of which parts may be made from a single piece of wire. The rear corner legs are formed by bending the ends of the wire downwardly then bent upwardly at $b$ and extended above the plane of the side bars, leaving the ends B' projecting as pins over which the bar $B^4$ may be passed by means of the eyes or loops $b^2$ at the opposite ends of said bar $B^4$.

To the front bar $B^2$ of this frame an egg receptacle is hingedly connected, and this receptacle comprises the metal box-form which consists of the top wall C having the upward extension C' at its rear edge, said extension being folded back on itself and clamping a fabric curtain which constitutes the back wall of the receptacle and will be presently described more in detail.

At each end of the folded back extension C' portions are rolled into tubular ears $C^2$ into which are placed the side portions of the front cross bar $B^2$, these bars forming the pintles of a hinge connection between the nest proper and the egg receptacle.

The egg receptacle includes also the side or end walls $C^3$ which are integral with the top wall, and these end walls are provided with the vertical rear end flanges $C^4$ which project inwardly and the horizontal bottom flanges or ledges $C^5$, the rear end flanges also have inwardly extending horizontal flanges $c^4$ which coincide with the bottom flanges or ledges $C^5$.

The top wall C preferably has its front edge bent downwardly, as at $c$ beginning at a short distance from its junction with the side or end walls leaving at each side a small passage or space $c'$.

Within this box form just set forth the egg tray is placed the tray consisting of the bottom wall D the front wall D' having the swaged out portion $d'$ to permit the hand to be introduced, the rear wall $D^2$ having the opening or gap $D^3$; the gap is made by slitting the back wall on parallel lines down to the bottom wall and then bending inwardly and downwardly the tongue $d^2$ thus generated to the position indicated in Figs. 3 and 6, the tongue then forming a somewhat resilient pad upon which the cardboard filler and trimmer rests.

This filler is made of more or less stiff but resilient card or straw-board and consists of the bottom member E and the ends E' which are bent upwardly from the bottom; the bottom is slit inwardly from its front edge approximately one-half its width and the portions $E^2$ at each side of the slit are then curled or bent upwardly and laterally as plainly shown in Fig. 7 and indicated in Figs. 2 and 3.

The filler is placed in the tray, the upturned ends E' then constituting the ends of the tray and the tray is then slid into the box form being virtually a drawer, the ends E' passing through the passages or spaces $c'$, the drawer being pushed rearwardly on the bottom edges or flanges $C^5$ until it rests against the back flanges $C^4$. The tray or drawer is retained in the box form by the small upturned tongues $c^5$ formed at the front end of the bottom flanges $C^5$.

As hereinbefore stated the back wall of the egg receptacle is formed of a curtain of fabric designed by the reference character F and at each side of its vertical center it has the slits $f$ which define a central flap F' which is very flexible and may swing freely back and forth.

Reverting again to the nest it will be seen that the floor of the same is a flexible net G of suitable size and shape to permit of its edges to be threaded or laced onto the side bars B the rear cross bar $B^4$ and the front cross bar $B^2$; this may be done by passing the said bars through the meshes of the net work or it may be done by other suitable means.

This net G is preferably made of cord, the meshes being relatively large, so that it will form a cool and flexible hammock-like nest, but not large enough to permit even undersized eggs to fall through.

It will be noted that the net by being threaded on the front crossbar which has the dropped portion $B^3$ is formed so that it slopes downwardly to the front and at the same time converges to the center so that an inclined runway is formed which will cause the laid egg to roll against the flap F' in the curtain F and pushing forwardly will be discharged into the egg receptacle.

As the egg rolls to the front of the tray the curled or curved portions $E^2$ will turn or guide it to one or the other side toward an end wall. As the filler part of the tray is cushioned by the flexible tongue $d^2$, the egg when it rolls out the same is received gently and not with a sudden jar or shock and hence will not be broken on its entry into the receptacle. As the eggs are not rolled into the receptacle with much momentum they will roll gently to the sides and will not be broken by contact with each other.

The net will feel like straw and if dyed in straw color will be as enticing to the hen as any other nest in which straw is largely used.

When straw is used the back cross rod $B^4$ is put in the last meshes, making the net slacker. When used without straw or a small amount of straw, the rod $B^4$ is to be put forward one mesh or a half mesh, and the ends of the rod B' act as a spring and will stretch the net as soon as the hen rises.

When the hen is on the nest in most instances the egg rolls into the drawer as soon as laid, as the hen keeps the net working. Otherwise it rolls to her feet and nowhere else; and no matter where she steps the egg is always near her feet where she cannot reach it to eat it, if she is an "egg-eater," nor trample on it, as when she puts her foot on another spot the egg is not there to be stepped upon. It follows her path and, if not before, it rolls into the drawer when she leaves the nest. The nest or glass eggs on the other hand do not roll into the drawer as they are placed under the net.

The net acts as a hammock, fitting itself snugly around the body of the hen, and as it takes the place of straw, it provides a laying chamber that is as nearly lice-proof, clean and comfortable as practically can be made.

A fact of great importance and one that will be highly appreciated is that the eggs can be gathered any time, no matter if the nest is occupied by the hen or not. Also that the nest always insures clean eggs. The egg crate can be kept in the hen-house to be filled direct from the trays.

It will thus be seen that I provide a nest that possesses many features: It prevents the hen from eating, breaking, addling or soiling the eggs; it is practically lice-proof, and it is clean and comfortable to the hen; it allows eggs to be gathered even if the nest is occupied. Also, it provides a handy means by which to keep a record of the egg production, a piece of paper and a pencil being kept in the drawer of one of the nests always at hand when eggs are gathered.

The device as a whole is very durable and will practically last forever, and despite its many good qualities, it can be manufactured and sold at a nominal cost.

I claim:

1. A device of the character described comprising a flexible frame, a net suspended in said frame and constituting a flexible bottom for the nest, said bottom having a forwardly and downwardly inclined front portion and an egg receptacle hingedly connected to the front of said frame and having communication with said forwardly and downwardly inclined front portion of the net.

2. A device of the character described comprising a flexible skeleton frame adapted to rest on a support, a net suspended on said frame constituting a nest bottom, said bottom having its front portion downwardly and forwardly converging, and an egg receptacle movably connected to the front of said frame, said receptacle having a flexible rear wall in juxtaposition to said downwardly and forwardly converging front portion of the nest bottom.

3. In a hen's nest, a frame provided with a flexible bottom, said bottom having a guideway for exit of eggs, the bottom inclining to said guideway, in combination with a receiving receptacle flexibly connected to the front of said frame.

4. A device as set forth in claim 3, the receiving receptacle having inclined guides disposed to guide the eggs to the side ends of the same.

5. A device as set forth in claim 3, the receiving receptacle including a removable tray, said tray having oppositely inclined guides disposed at each side of its transverse center to turn the eggs to opposite ends of the tray.

6. A device as set forth in claim 3, the rear wall of the receiving receptacle consisting of a flexible curtain controlling the front of the guideway.

7. A hen's nest comprising a skeleton frame made from a single piece of wire and including side bars, downwardly extending supporting legs at the rear ends of said bars, and a front cross bar having its central portion offset downwardly to form an egg exit from the nest, a flexible net having its side edges threaded on said side bars and its front edge threaded on the front bar and its downwardly offset central portion, forming a forwardly and downwardly runway for the nest bottom, and an egg receiving receptacle attached to the front bar of said frame.

8. A device of the character described comprising a flexible nest member and an egg receiving receptacle attached to the front thereof, said receptacle including a casing having rigid top and end walls, a flexible curtain rear wall, an open bottom, and a tray drawer removably mounted in said casing.

9. A device of the character described comprising a flexible nest member having a runway at its front, and an egg receiving receptacle attached to the front thereof; said receptacle including an open front and bottom casing, a drawer slidably fitting in said casing, said drawer having front and rear walls and open at opposite ends, a flexible filler consisting of a bottom and end walls fitted in said drawer, the bottom wall having its front edge slit at the transverse center and wings curled upwardly and laterally at each side of the slit to form guides or deflectors for the entering eggs, the rear wall of the receptacle having a passageway for the entrance of eggs from the runway of the nest bottom.

10. In a hen's nest of the character specified, an egg receiving receptacle consisting of a metal casing having an open front and bottom, and end walls, and a flexible slit curtain as a rear wall, horizontal inwardly projecting ledges at the lower ends of the end walls, and a receiving tray removably held on said horizontal ledges, said tray having an aperture in its rear wall to receive the eggs from the nest member.

11. A hen's nest comprising a skeleton frame made from a single piece of wire, said wire bent to form side bars, downwardly bent supporting legs at the rear ends of the side bars, the legs having upwardly extending portions or pins projecting above the plane of the side bars, a rear cross bar having eyes adapted to engage such upwardly projecting portions, a front cross bar having a downwardly offset center portion, and a textile net threaded on said side, front and rear bars.

FREDRICK NILSON BACKLIND.